Nov. 13, 1951 A. W. TYLER ET AL 2,575,034

READER FOR TRANSLATING DIGITAL DATA RECORDED ON FILM INTO ELECTRIC PULSES SUITABLE FOR INPUT TO A COMPUTER

Filed Sept. 22, 1949 3 Sheets-Sheet 1

ARTHUR W. TYLER
RUSSELL D. O'NEAL
INVENTORS

BY Daniel J. Mayne
Rolla N. Carter
ATTORNEYS

READER FOR TRANSLATING DIGITAL DATA RECORDED ON FILM INTO ELECTRIC PULSES SUITABLE FOR INPUT TO A COMPUTER

Filed Sept. 22, 1949 3 Sheets-Sheet 2

ARTHUR W. TYLER
RUSSELL D. O'NEAL
INVENTORS

BY Daniel O. Mayne
Rolla N. Carter
ATTORNEYS

ARTHUR W. TYLER
RUSSELL D. O'NEAL
INVENTORS
BY Daniel J. Mayne
Ella N. Carter
ATTORNEYS Patented Nov. 13, 1951 2,575,034

UNITED STATES PATENT OFFICE 2,575,034

READER FOR TRANSLATING DIGITAL DATA RECORDED ON FILM INTO ELECTRIC PULSES SUITABLE FOR INPUT TO A COMPUTER

Arthur W. Tyler, Rochester, N. Y., and Russell D. O'Neal, Ann Arbor, Mich., assignors to Eastman Kodak Company, Rochester, N. Y., a corporation of New Jersey Application September 22, 1949, Serial No. 117,094

5 Claims. (Cl. 235—61.11)

This invention relates generally to computational aids and more particularly to reading equipment for translating into suitable electric pulses data stored in binary abacus form on a permanent record such as motion picture film. The specific embodiment to be described was designed for reading the records made by the external memory device described in detail in our copending application Serial No. 46,656, filed August 28, 1948.

All practical large-scale, high-speed digital computing machines require large capacity, auxiliary memory or storage devices and in order to utilize the inherent high speed of electronic computers it is necessary to provide equipment to furnish data quickly and easily to the computer at a rate compatible with its computing speed.

The general object of the invention is to provide an apparatus which will, under the control of a computer, transfer to the computer in the form of electric signals input data and orders from a record film.

A further object of the invention is to provide reader apparatus with which each digital signal furnishes its own stepping pulse thereby avoiding the need for synchronized trains of pulses.

Another object of the invention is the provision of a reader device which will, under the control of a computer, move the record film in either direction and at widely different speeds.

Still another object of the invention is the provision of a reader device which will simultaneously read a word and its complement, sometimes called invert, when both are recorded on a film.

Other objects and advantages of the invention will become evident from the following description of a preferred embodiment of the invention. The invention itself will be best understood from the following description when read in connection with the accompanying drawing and its scope is pointed out in the appended claims.

In accordance with the invention, when the computing machine with which the reader is integrated wants to receive a word or a group of words, it selects a motor speed, sends a signal starting the motor in a clockwise or counterclockwise direction as desired, and then sends a start reading signal which connects the motor to the film-advancing means. As soon as a reference mark indicating the location of a word on the film comes to a scanning point, a signal is generated for triggering the sweep circuit and the unblanking circuit of a cathode ray tube, the face of which is covered with a mask apertured in a manner consistent with the type of record on the film. This mask is imaged on the film so that the sweep of the cathode ray beam scans the film transversely and light-sensitive cells positioned behind the film derive successive signals representative of the record for transmission to the computer. The various signals furnished by the computer for starting, stopping, speed and direction selecting, and the like, originate in the computer in accordance with its programming and their ancestry is of no direct concern to the reader apparatus of the present invention, although, of course, the programming of the computer must be consistent with the construction of the reader.

Figure 1:
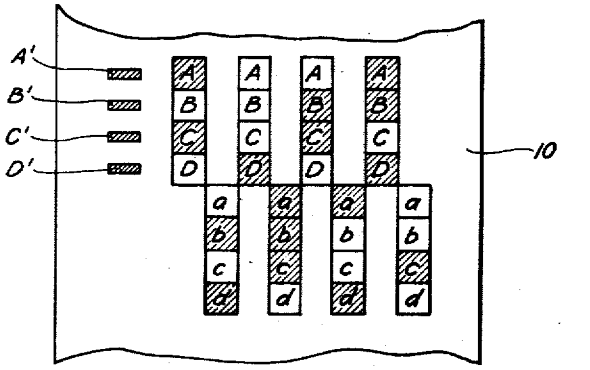
Fig. 1 shows a portion of a film bearing recorded data which may be read by the apparatus of the invention.

As described in our copending application, Serial No. 46,656, the data stored on the record film may take any of a variety of forms, but, since the principle involved in reading different forms is the same, only one form of record will be here considered. A typical record form is shown in Fig. 1 as comprising a suitable support 10, preferably 35 mm. film, upon which has been recorded a plurality of words A, B, C and D and their complements *a*, *b*, *c* and *d*, together with reference marks A', B', C' and D', respectively, indicating the location of the words. The words are shown as consisting of four digits each while in practice they will preferably be twenty-five digits each. Also, the record comprises opaque areas on transparent film although the reader to be described can readily be modified to work with records in the form of transparent areas on opaque film. An important characteristic of the word and complement record is that either the word or the complement but not both has an opaque area in each digital position. This characteristic provides for the generation of stepping pulses in the mixing circuit 62 and also provides a convenient means of checking against reading errors.

Figure 2:
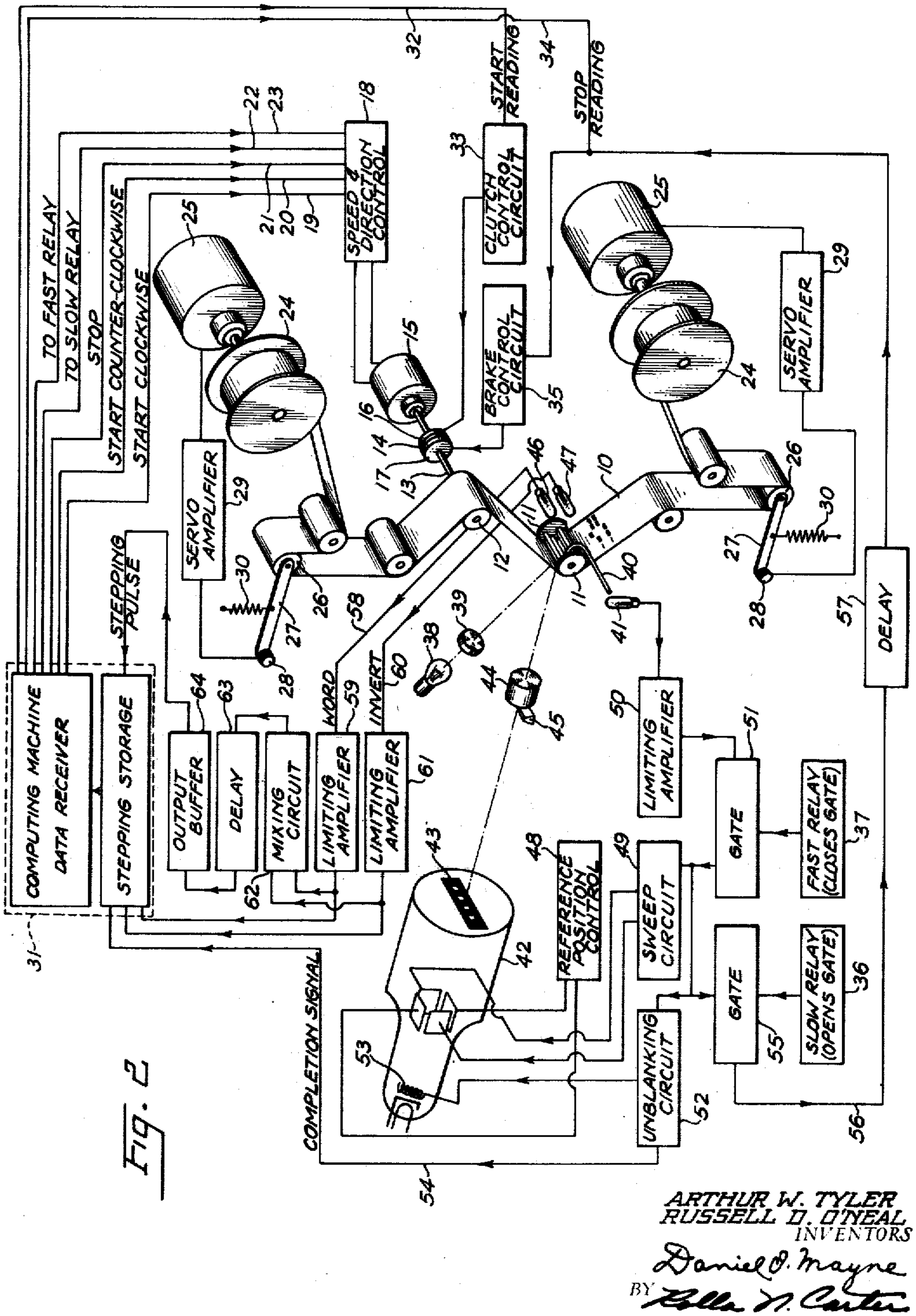
Fig. 2 is a schematic diagram of a preferred embodiment of the invention.

The operation of the reader of the invention and its integration with a computing machine will be clear from a consideration of Fig. 2. As shown, the record film 10 is supported at a reading station by two spaced discs 11 engaging the margins of the film 10 and is transported in either direction and at selectively different speeds past the reading station by a drive roller 12 mounted on a shaft 13 having a clutch disc 14 for providing a driving connection to a motor 15 through an electromagnetic member 16 carried by the shaft of the motor 15. Also associated with the clutch disc 14 is a stationary electromagnetic member 17 which, when energized, attracts the clutch disc 14 to function as a brake for the drive roller 12. The speed and direction of rotation of the motor 15 is controlled by a device 18 having five leads 19, 20, 21, 22 and 23 for actuating the control device 18 to cause the motor 15 to run clockwise or counterclockwise, to stop, to rotate at a slow, normal or fast speed. Control apparatus, such as the device 18, is available commercially and is not here described in detail. It will be understood that the slow speed and the fast speed are related to the normal speed of the motor 15 i. e., the speed when no speed control is involved.

For keeping the film 10 at all times taut over the discs 11 at the reading station, each end of the film 10 is secured to a reel 24 adapted to be driven by a servo motor 25 in a direction and at a speed determined by the length of the film 10 between the reading station and the reed 24. This is accomplished by means of a dance roller 26 mounted on one end of a lever arm 27, the other end of which is secured to the shaft of a potentiometer 28 so that movement of the arm 27 with changes in the position of the roller 26 correspondingly changes the adjustment of the potentiometer 28 which in a well-known manner controls the servo motor 25 through a servo amplifier 29. The control movement of the arm 27 may be produced by looping the film 10 around the dance roller 26 and biasing the roller 26 against the tension of the loop as by a spring 30 secured to the arm 27.

In the operation of the reader the film transport arrangement described above functions in a manner now to be described. The five leads 19, 20, 21, 22 and 23 to the speed and direction control device 18 are connected to a computing machine 31 which will according to its programming send suitable signals to the device 18 for starting the motor 15 in the direction and at the speed desired. With the motor 15 running the computing machine 31 sends a signal over a lead 32 to a clutch control circuit 33 to engage the clutch disc 14 and the clutch member 16 whenever it wants to move the film 10 and sends a signal over a lead 34 to a brake control circuit 35 to engage the clutch disc 14 and the brake member 17 when it wants to stop the film 10. The control device 18 includes a slow relay 36 and a fast relay 37, the operated conditions of which perform functions additional to speed control, as described below, and for convenience these relays 36 and 37 are located in the drawing to indicate the additional functions without specifically showing their speed control functions in the motor control device 18.

Figure 3:
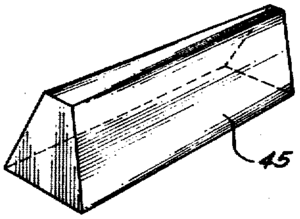
Fig. 3 is a view in perspective of a prism which is a component of the apparatus of Fig. 2.

The scanning of the film 10 for reading purposes is accomplished by two optical systems, one of which comprises a source of light 38 and a lens 39 for imaging a small line of light on the portion of the film 10 where the reference marks A′, B′, etc., are located and a light rod 40 and a photocell 41 for receiving light transmitted by the reference mark portion of the film 10. The other of the two optical systems includes a cathode ray tube 42, the fluorescent face of which is provided with a mask 43 having apertures corresponding to one half of the mask used in making the record on the film 10 and an objective lens 44 for imaging the mask 43 on the record portion of the film 10. When as is usual, the record on the film 10 consists of a word and its complement, it is desirable to scan both the word and the complement simultaneously. This may be accomplished as shown in Fig. 2 by placing a suitable prism 45 in front of the lower half of the objective lens 44 to divide the image bearing light so that two images of the mask 43 will be formed, one coinciding with the recorded word and the other coinciding with the recorded complement on the film 10. For the type of record shown in Fig. 1 the prism 45 has power in two directions as shown in Fig. 3. For reducing the possibility of error due to small inaccuracies in the lateral position of the film 10 and the locations of the record areas, the images formed on the film 10 are made smaller than the record areas and this way conveniently be accomplished by proper choice of aperture size in the mask 43. Light transmitted by the film 10 from the two images of the mask 43 is directed, respectively, to two photocells 46 and 47 by suitable optics arranged behind the film 10 as will be described in conection with Figs. 4 and 5. Thus, the photocell 46 receives light coming through the word position and the photocell 47 receives light coming through the complement position.

The vertical deflecting plates of the cathode ray tube 42 are connected to a reference position control device 48 which is adjustable for bringing the beam into horizontal alignment with the apertures in the mask 43. The horizontal deflecting plates of the tube 42 are connected to a sweep circuit 49 which is adapted to be triggered by pulses from the photocell 41 through a limiting amplifier 50 and a gate 51. For searching purposes later described the gate 51 is closed when the fast relay 37 is actuated. The pulses from the photocell 41 also trigger an unblanking circuit 52 which furnishes a positive pulse to the grid 53 to turn on the beam of the cathode ray tube 42 for an interval equal to the time required for completion of one sweep of the beam at the end of which the circuit 52 sends a completion signal over a lead 54 to the stepping storage section of the computing machine 31. When the slow relay 36 is actuated for reading word by word as discussed below a gate 55 is opened to pass pulses from the photocell 41 over a lead 56 through a delay circuit 57 to the brake control circuit 35.

The duration of the horizontal sweep which simultaneously scans the word and complement is relatively short compared to the minimum time required for the film to move a distance equal to the spacing of the words along the film. Consequently, it is not necessary to tilt the direction of sweep in order to compensate for the film motion during the sweep. Reading can be done at all film speeds up to the normal speed in either direction. The residual tilt error is less than the tolerances provided for in the position of the film.

Signals generated by the photocell 46 are fed over a lead 58 through a limiting amplifier 59 to the stepping storage section of the computing machine 31. Signals generated by the photocell 47 are similarly fed to the stepping storage over a lead 60 and through a limiting amplifier 61. The signals from both of the photocell 46 and 47 are fed through a mixing circuit 62, a delay circuit 63, an output buffer 64 and then to the stepping storage as a stepping pulse. When reading a record having words only, i. e., no complements, the stepping pulses for each digital position may be obtained from a photocell receiving light from a beam splitter positioned between the cathode ray tube 42 and the record film 10 as described in our above-identified application. With this latter arrangement the stepping pulses will register ones in the stepping storage unless a zero is furnished by the reading phototube.

Figure 2A:
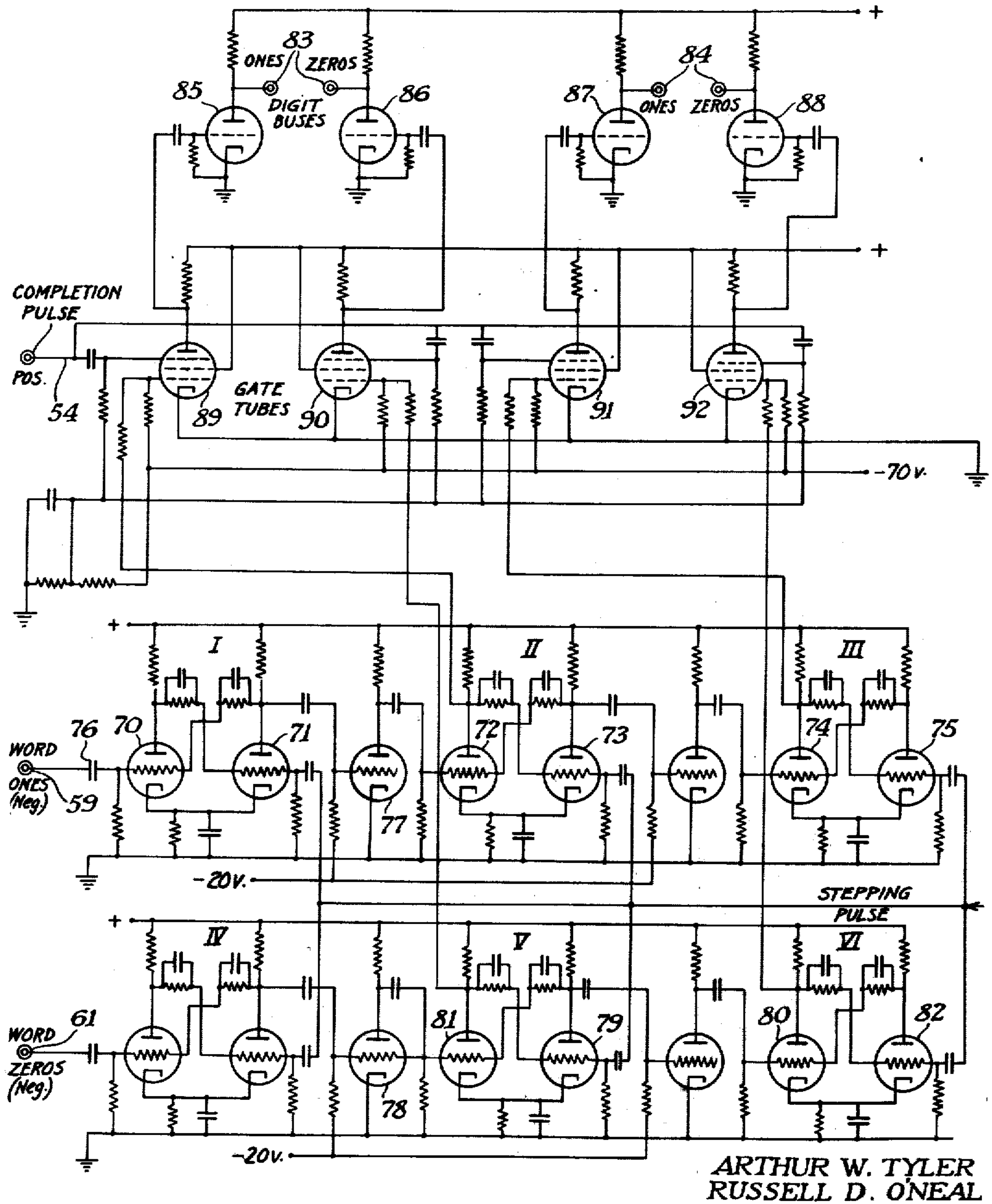
Fig. 2A is a schematic circuit diagram of the stepping storage and data receiver of the apparatus of Fig. 2.

The data receiver and stepping storage of the computing machine 31 may take any of numerous forms, and for the purpose of this disclosure a two-digit stepping storage is shown in Fig. 2A. This arrangement is quite similar to the stepping storage data dispensing device shown in Fig. 3A of our above-identified copending application but differs therefrom in that it operates in a reverse manner, i. e., in Fig. 3A the digits of a word are transferred in parallel from the computing machine to a storage device from which the digits are stepped out serially whereas in the present arrangement of Fig. 2A the digits of a word are serially stepped into the storage and later transferred in parallel to the digit buses of the data receiving portion of the computer. It will be noted in Fig. 2A that the leads from the amplifiers 59 and 61 through which the words and inverts (ones and zeros) pass comprise the inputs of two similar storage registers, one of which stores a word and the other stores the invert. The word is received and stored in three identical trigger circuits I, II and III having, respectively, triodes 70 and 71, 72 and 73, and 74 and 75, cross-connected in a well-known manner so as to have two stable conditions in which one or the other of the tubes in the trigger circuit is conducting. The grid of the first triode 70 is connected to the anode of the second triode 71 through a suitable impedance network and the anode of the triode 70 is connected to the grid of the triode 71 through a similar network. Thus, a negative pulse on the grid of either of the triodes 70 and 71 will cut it off and make certain that the other conducts, and the same argument applies to the other trigger circuits II and III. The grid of the first tube 70 in the trigger circuit I is connected through a coupling capacitor 76 to the output of the amplifier 59.

In operation, if it is assumed that initially the trigger circuit I is in binary zero condition, i. e., the tube 70 is conducting, a negative pulse representing a one applied through the coupling capacitor 76 to the grid of the tube 70 renders the tube 70 nonconducting. Thus, the anode of the tube 70 becomes more positive and a positive pulse will be applied to the grid of the tube 71 causing the tube 71 to conduct thereby placing the trigger circuit I in the binary one condition. If the output of the amplifier 59 had been no pulse, or a positive pulse, representing a zero, the tube 70 would have remained conducting and the trigger circuit would have remained in the binary zero condition.

The storage register for the invert (zeros) comprises three trigger circuits IV, V and VI identical with the trigger circuits I, II and III but having the grid of the first tube coupled to the output of the amplifier 61. With the unit IV initially in binary one condition, a negative pulse from the amplifier 61 functions to transfer current from the left to the right side of unit IV, thereby placing it in the binary zero condition.

It will be seen in Fig. 2A that the anodes of the right-hand tubes of the trigger units I and IV are coupled, respectively, to the grids of transfer amplifier tubes 77 and 78, and that each of these transfer tubes 77 and 78 is biased to cutoff by having its grid connected to a suitable source of negative potential. The anode of the transfer tube 77 is coupled to the grid of the left-hand tube of trigger unit II and the anode of the transfer tube 78 is coupled to the grid of the left-hand tube of the trigger unit V. It will also be seen that a stepping pulse coming from the output buffer 64 of Fig. 2 is applied simultaneously to the grid of the right-hand tube in both trigger units I and IV. The units II and V are similarly coupled through transfer tubes to the units III and VI.

Assuming that the word 01 and its invert are to be placed in storage, the negative pulse, representing a one, coming from the amplifier 59 transfers current from the left to the right side of the trigged unit I while trigger unit IV is unaffected, i. e., its left side remains conducting, and the same pulse after passing through the mixer 62, delay 63, and buffer 64 is applied to the grids of the right sides of the trigger units I and IV as a stepping pulse. This stepping pulse applied to the grid of the right-hand tube 71, which is conducting, will cut off the tube 71 which returns the trigger unit to binary zero condition and furnishes a positive pulse to the grid of the transfer tube 77. Due to normal phase inversion in the transfer tube 77, a negative pulse will be derived from the anode thereof and applied to the grid of the left-hand tube 72 in the trigger unit II to transfer current to the right-hand tube 73 thereby placing the unit II in binary one condition. This stepping pulse is also applied to the grid of the right-hand tube in trigger unit IV but, since this tube is not conducting, nothing happens and the trigger unit IV remains in binary one condition. Since the trigger unit V remained unchanged in binary one condition, the one stored in the trigger unit IV has effectively been stepped to the trigger unit V. After the one and its invert have been transferred to the trigger units II and V the next digit, this time a zero, appears as a negative pulse on the grid of the left-hand tube of the trigger unit IV to place the unit IV in binary zero condition. The unit I being unaffected remains in binary zero condition. A stepping pulse derived from the digit pulse is now applied to the right sides of the four trigger units I, II, IV and V to transfer the digits stored therein to the next trigger unit to the right which places units III and VI in binary one condition, units II and V in binary zero condition and leaves units I and IV in their assumed starting condition. That is, tubes 72, 75, 79 and 80 are conducting, tubes 73, 74, 81 and 82 are not conducting, thereby storing the word 01, and the left-hand sides of units I and IV are conducting.

The data receiver of the computing machine may comprise pairs of digit buses 83 and 84 (one pair for each digit) connected to the anodes of triodes 85, 86, 87 and 88, respectively, to which the word in the storage may be transferred in parallel through gate tubes 89, 90, 91 and 92 having two grids which must both be positive in order for the tube to conduct. The gate tubes 89 to 92 have one of their grids connected, respectively, to the anodes of trigger unit tubes 72, 81, 74 and 80 and the other of their grids coupled to the lead 54 over which the positive completion pulse is transmitted after the reading of each word. With the word 01 in the storage as above described, the first grids of gate tubes 90 and 91 are positive because the trigger unit tubes 81 and 74 to which they are connected are not conducting. Thus, when the other grid of all the gate tubes 89 to 92 are rendered positive by the completion pulse, the gate tubes 90 and 91 are the only ones to become conducting. When these tubes conduct their associated tubes 86 and 87 are cut off and their digit buses become positive. This posts the word 01 on the digit buses for distribution in accordance with the programming of the computer.

Figure 4:
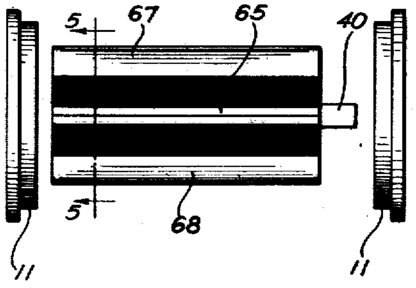
Figs. 4 and 5 are front elevation and cross section views, respectively, of the reading station of the apparatus of Fig. 2.
Figure 5:
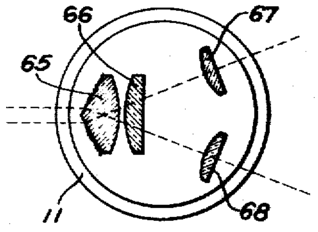

The optics at the reading station for directing light onto the photocells 46 and 47 are shown in Figs. 4 and 5 as comprising a biprism 65 having a spherical rear surface, a plano convex lens 66 and two auxiliary cylindrical lenses 67 and 68. Portions of the prism faces of the biprism 65 are preferably blackened for limiting in the vertical direction the opening through which light may enter its faces. The end of the light rod 40 through which light enters is shown in Fig. 4.

*Reading operation, normal speed*

When the program of the computer 31 requires a plurality of words in rapid sequence a signal is transmitted over lead 19 to start the motor 15 in, for example, a clockwise direction. The computer 31 then sends a "start reading" signal over lead 32 to the clutch control circuit 33 which energizes the electro-magnetic member 16 to engage the clutch disc 14 thereby driving the roller 12 to move the film 10 past the reading station. When a reference mark on the film 10 interrupts the light coming from the source 38 a signal is generated in the photocell 41. This signal after amplification triggers the sweep circuit 49 and the unblanking circuit 52 to cause a single sweep of the cathode ray beam across the mask 43 which serves to scan the word position and the complement position on the film 10. If the word A of Fig. 1 is in the reading position, the scanning light will encounter the first light transmitting area in the complement position and the photocell 47 will generate a signal which after passing through the limiting amplifier 61 is furnished to the stepping storage of the computer 31. This signal from the photocell 47 is also passed through the mixer circuit 62, the delay circuit 63 and the output buffer 64 to provide a stepping pulse to the stepping storage after the scanning sweep has passed entirely beyond the area of the spot giving rise to the signal. As the sweep continues the next clear area is encountered in the word position and the photocell 46 generates a signal which is amplified and fed to the stepping storage and which is mixed and delayed to furnish a stepping pulse. The manner in which the stepping pulses shift the digits in the stepping storage to make room for the next succeeding digit is well known and may be the same as the stepping data dispensing device described in our above-identified application. At the end of the sweep an entire word and complement has been transferred from the film 10 to the stepping storage. The timing of the unblanking circuit 52 is such that at the end of the sweep the tube 42 is again blanked and a completion signal is sent over lead 54 to the stepping storage for initiating a checking operation, if desired, and for causing the data in the stepping storage to be transferred to the data receiver of the computer 31. When the next reference mark, say B', on the film 10 moves into the right interrupting position between the source 38 and the photocell 41 another reading cycle as above described is initiated. This process continues until the computer 31 sends a "stop reading" signal over the lead 34 to energize the brake control circuit 35 and thereby stop the film 10.

*Single word reading*

It is desirable to be able to read one word at a time as distinguished from reading a plurality of words in sequence and when so programmed the computer 31 first transmits a signal to the speed control 18 to energize the slow relay 36 which also opens the gate 55. The computer 31 next signals over lead 19 or 20 to start the motor 15 and then signals "start reading" over lead 32. As above described as soon as a reference mark on the film 10 interrupts the light to the photocell 41 a word will be read and transferred to the stepping storage. In the present case the gate 55 is open and the limiting amplifier 50 transmits a signal through the gates 51 and 55 and the lead 56 to the brake control circuit 35 for stopping the film 10. The delay 17 is placed in the lead 56 to make certain that the reference mark has moved completely past the light beam passing to photocell 41 before the film 10 is brought to rest. Thus the reader apparatus stops itself after each word and the computer 31 must send a reading signal for each word.

*Searching for data*

It is sometimes desirable to search for data on the film 10 as when a particular value in a table is needed. When the computer 31 wants to search it sends a signal over lead 23 to actuate the fast relay in the speed control device 18 and then sends a signal to start the motor 15 in a desired direction. A "start reading" signal engages the clutch disc 14 to the drive member 16 and the film 10 advances as before. However, since the actuation of the fast relay closed the gate 51, signals from the photocell 41 do not reach the sweep circuit 49 and no scanning of the film 10 occurs. After a time interval determined by the computer 31 the film 10 is stopped by means of a signal over lead 34 to the clutch control device. The computer may then take a sample reading to determine whether or not more searching is required.

It will be evident from the foregoing that the reader of the present invention will in response to suitable signals from a computer furnish to the computer in proper signal form the information carried on a record film; will read a single word or a plurality of words in rapid sequence; and will move the record film for searching purposes without reading it.

While for the purpose of explaining the invention a single embodiment has been described, it will be obvious to those skilled in this art that the novel features may be incorporated in a variety of embodiments without departing from the scope of the invention pointed out in the appended claims.

Having thus described our invention, what we claim is new and desire to secure by Letters Patent of the United States is:

1. Apparatus of the class described for integration with a computer having a stepping storage for receiving data, comprising a word input circuit and a complement input circuit for the stepping storage, means for moving a film strip having coded words thereon past a reading station, said words being distributed lengthwise of the film and the digits of said words being distributed transverse of the film, photoelectric scanning means for analyzing in digital sequence each coded word moved past the reading station to generate for each digit analyzed an electric signal in the word circuit or the complement circuit in accordance with the value of each digit, a delay circuit connected to both the word circuit and the complement circuit for furnishing a stepping pulse to the stepping storage for every electric signal generated by said scanning means, and time responsive means for furnishing a completion signal to the stepping storage after each word has been analyzed.

2. In apparatus for reading from a film strip having data recorded thereon in the form of clear and opaque areas distributed laterally across the film and having a light modifying reference mark associated with each line of data, means for moving the film past a reading station, means responsive to the entrance of the reference mark into the reading station for generating an electric pulse, a cathode ray tube for scanning a line of data on the film, a sweep circuit for the cathode ray tube connected to be initiated by said electric pulse and so constructed as to generate an electric signal at the completion of a sweep, and means controlled by said electric signal for stopping said film moving means.

3. Apparatus of the type described in claim 2 including a motor for driving the film moving means, a relay for energizing the motor to run at a slow speed, and a gate circuit between the sweep circuit and the means for stopping the film moving means and connected to be in open condition only when the slow speed relay is actuated.

4. Apparatus in accordance with claim 2 wherein each digital area transverse of the film is illuminated in sequence and the digital value of each such area is fed to a stepping storage device in the form of an electric signal, and means responsive to the illumination of each such area for furnishing after a suitable delay, a stepping signal to the stepping storage device.

5. Apparatus of the class described for integration with a computer having a stepping storage for receiving data comprising a data input circuit for the stepping storage, means for moving past a reading station a film strip having data recorded thereon in the form of digits represented by clear and opaque areas distributed laterally across the film strip, a cathode ray tube, a mask on the face of the tube having apertures corresponding to the record areas on the film strip, means for imaging the mask on the film strip at the reading station, a sweep circuit for causing the cathode ray tube to illuminate in sequence the apertures in the mask, whereby the record areas on the film strip are illuminated in sequence, means for energizing said input circuit in accordance with the digital value of each record area, and light sensitive means responsive to the illumination of each of said apertures for deriving stepping signals for the stepping storage, whereby each digital signal and its corresponding stepping signal are self-synchronized.

ARTHUR W. TYLER.
RUSSELL D. O'NEAL.

REFERENCES CITED

The following references are of record in the file of this patent:

UNITED STATES PATENTS

| Number | Name | Date |
|---|---|---|
| 2,097,392 | Finch | Dec. 4, 1935 |
| 2,401,021 | Rosenberg et al. | May 28, 1946 |

Certificate of Correction

Patent No. 2,575,034 November 13, 1951

ARTHUR W. TYLER ET AL.

It is hereby certified that error appears in the printed specification of the above numbered patent requiring correction as follows:

Column 4, line 21, for "way" read *may*; column 5, line 59, for "zero." read *zero,*; column 6, line 18, for "trigged" read *trigger*; column 7, line 71, for "right" read *light*;

and that the said Letters Patent should be read as corrected above, so that the same may conform to the record of the case in the Patent Office.

Signed and sealed this 4th day of March, A. D. 1952.

[SEAL]

THOMAS F. MURPHY,
*Assistant Commissioner of Patents.*